June 23, 1936.　　　　J. ZUBATY　　　　2,044,930
SYNCHRONIZED DRIVING MECHANISM
Filed Dec. 11, 1933　　　2 Sheets-Sheet 2

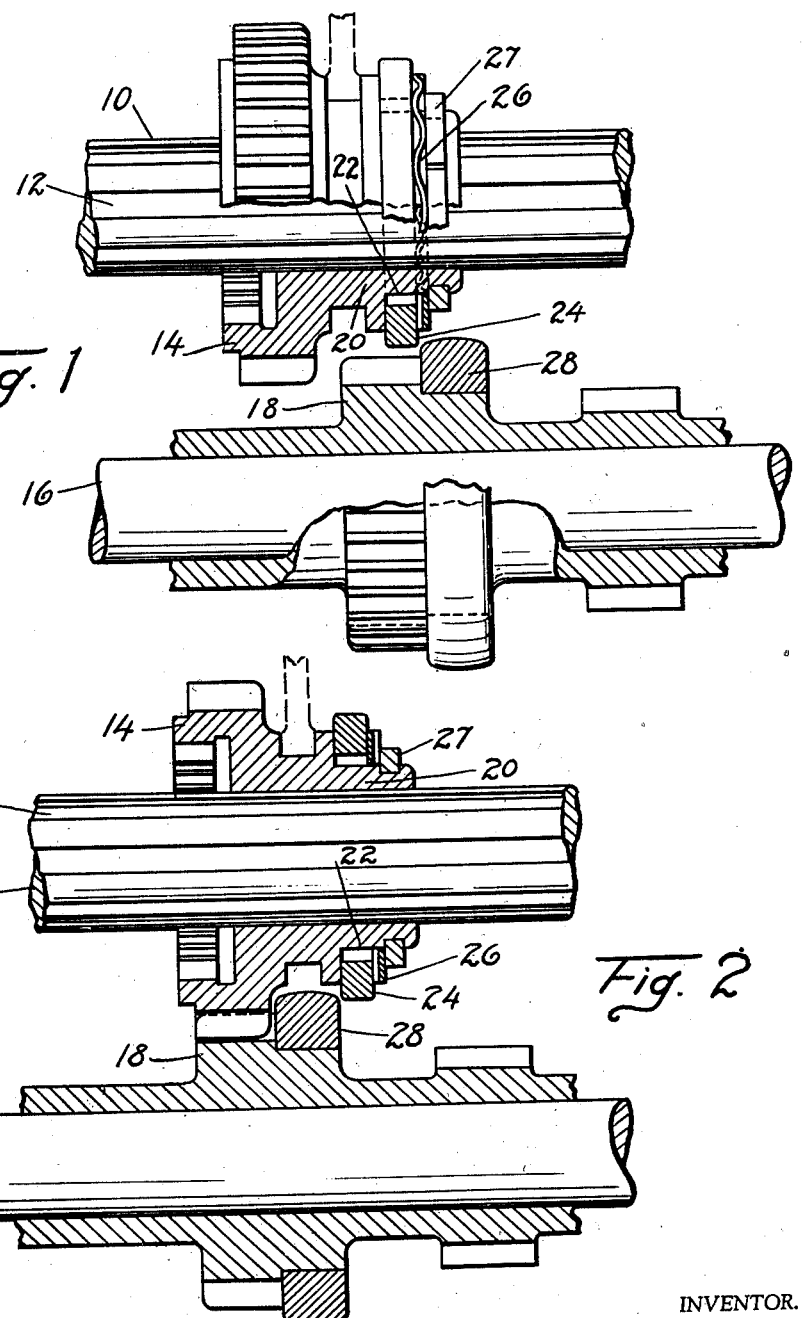

INVENTOR.
Joseph Zubaty
BY
ATTORNEYS.

Patented June 23, 1936

2,044,930

UNITED STATES PATENT OFFICE 2,044,930

SYNCHRONIZED DRIVING MECHANISM

Joseph Zubaty, Prague, Czechoslovakia

Application December 11, 1933, Serial No. 701,813

8 Claims. (Cl. 74—339)

My invention relates to improvements in mechanism adapted to synchronize the engagement of cooperating driving members.

An object is to provide simple, inexpensive, efficient mechanism whereby a driving and a driven member may be brought into substantially synchronized rotation prior to interengagement for driving. This improved mechanism may be associated with power transmitting members carried on shafts spaced one above the other and one of which members is shiftable into driving engagement with the other. My improved mechanism is adapted to cause the members to be brought into substantially synchronous rotation before direct engagement for driving so that the engagement of the rotating members will be accomplished smoothly and easily.

My improved synchronizing mechanism may be employed to accomplish synchronization of axially aligned driving members before direct driving engagement thereof, or to synchronize the rotation of a gear and its shaft before they are coupled together for driving.

A meritorious feature is the provision of simple and inexpensive means of the character described which may be associated within a minimum of space with cooperating rotary power transmitting members, such as transmission gears, and which functions, upon relative movement of said gears toward their cooperative driving relationship, to synchronize their rotation so as to cause them to move into driving engagement smoothly and without shock, noise, or clashing.

Figure 5:
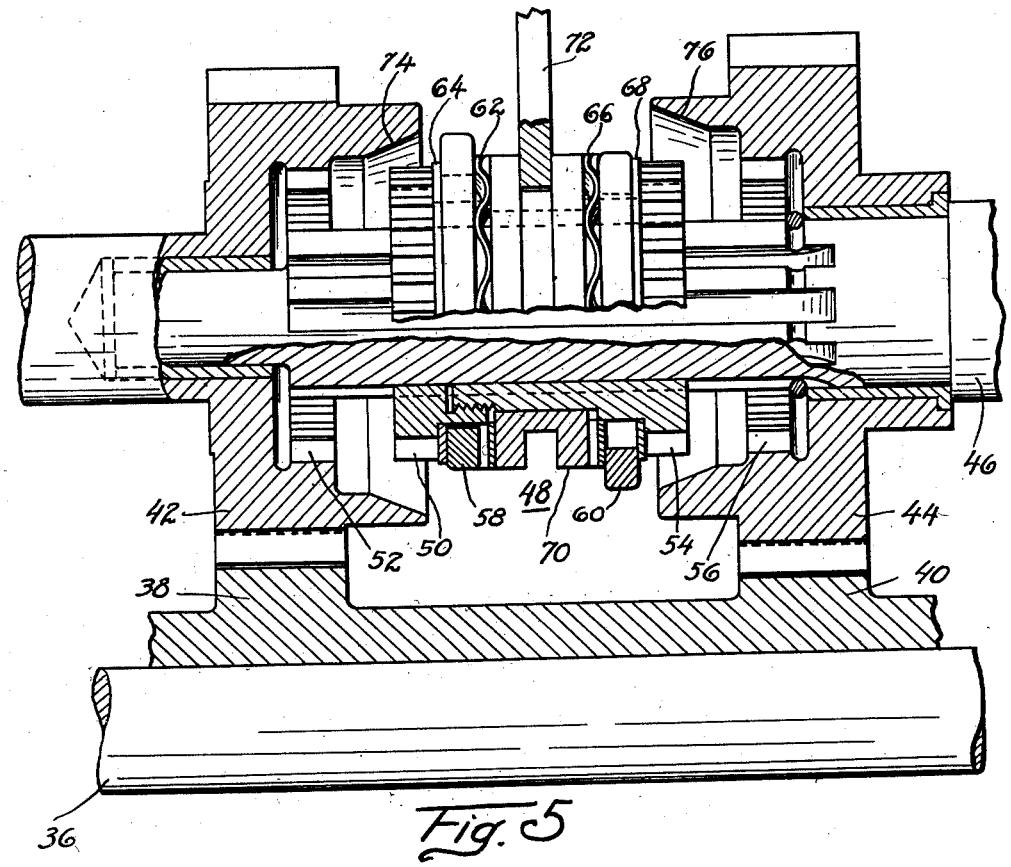
Figure 3:
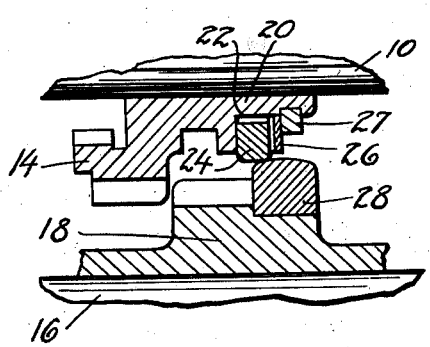
Figure 4:
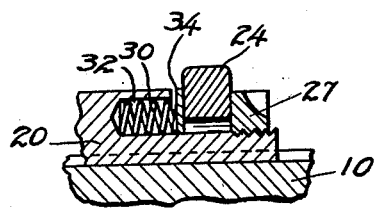

While my invention is illustrated as embodied in certain specific constructions it is obviously adaptable to other specific structures and other objects, advantages, and meritorious characteristics will more fully appear from the following description, appended claims, and accompanying drawings, wherein:

Figure 1 illustrates my invention associated with driving gears mounted on spaced apart parallel shafts and wherein the gears are disengaged, Figure 2 illustrates my invention associated with the same gears in driving engagement, Figure 3 is a fragmentary view of the same gearing immediately prior to the gears being brought into driving engagement, Figure 4 is a fragmentary illustration of a modified form of construction, and Figure 5 illustrates the adaptation of my invention to coaxially arranged driving members.

In Figures 1 and 2 of the drawings I have shown my invention as associated with cooperating driving gears arranged on spaced parallel shafts. One of these gears is movable into direct driving engagement with the other gear. My improved synchronizing mechanism is adapted to ease said gears smoothly into direct driving engagement without any resulting jar or shock.

In Figures 1 and 2 let 10 indicate a driving shaft splined as at 12 and provided with a driving gear 14 mounted thereon for axial movement thereover. A driven shaft 16 is provided with a driven gear 18 mounted thereon. Figure 1 shows the gears disengaged. Figure 2 shows the gears in direct driving engagement. Each gear has associated therewith a synchronizing friction element. When the gears are moved toward their direct driving engagement these frictional elements are first brought into frictional driving contact. Continuance of this frictional driving contact as the gears continue to move toward their position of direct driving engagement tends to synchronize the rotation of the gears prior to being brought into direct driving engagement.

In the first two figures of the drawings each of these synchronizing friction elements is shown in the form of an annular disc or ring. Gear 14 has a hub provided with a groove or channel 22 formed between the shoulder which constitutes one side wall of the groove and a retaining ring 27 which constitutes the other side wall of the groove. Within this groove 22 is disposed the annular friction disc or ring 24. The ring 24 has a clearance within the groove as shown in Figure 1 so that it may be moved therein radially to different positions of eccentricity with respect to the gear. In Figure 1 it is shown as positioned concentric with the gear. It is held by a ribbon spring 26 against one side wall of the groove. It is moved radially within the groove to different positions against the resistance imposed by the spring which holds it frictionally against the side wall of the groove.

The element 24 may be formed of suitable material having a high coefficient of friction, such as "Celeron", brass, cast iron, or the like. There is a clearance of .030 to .060 between the ring and the bottom of the groove. This element is spaced axially from the gear 14 such a distance greater than the width of the cooperating gear 18 that the rings 24 and 28 may frictionally contact to produce the desired synchronization prior to the driving engagement of the gears.

Associated with the gear 18 is another synchronizing friction element 28 in the form of an annular disc or ring. Element 28 may be formed of material similar to that of element 24. Friction element 28 is here shown as located on the same side of its gear as the frictional element 24 is positioned with respect to its gear. Element 28 has a rounded periphery and has a diameter greater than the diameter of its gear 18 while element 24 has a diameter less than the diameter of its gear 14.

Rings 24 and 28 are so dimensioned and ring 24 is so positioned with respect to its gear 14, being spaced axially therefrom a distance greater than the width of a gear 18, that when the ring 14 is moved toward direct driving engagement with gear 18 the synchronizing friction elements 24 and 28 come into frictional driving contact sufficient to equalize the rotation of gears 14 and 18 before such gears effect their direct driving connection.

In Figure 1 a portion of a shifter fork is shown in dotted outline. Through the use of this shifter fork the gear 14 is moved axially toward its position of driving engagement with the gear 18. The friction ring 24 moves with the gear 14 and comes into frictional contact with the friction ring 28. As the friction rings 24 and 28 are brought into frictional contact continuation of the axial movement of gear 14 is necessary to bring it into direct driving engagement with the gear 18 and causes the ring 24 to move radially within the groove 22. The clearance of the ring 24 within the gear is such that it permits the ring so to move radially. This radial movement of the ring within its groove is against the frictional resistance of the ring upon the side wall of the groove against which it is held by the spring 26. Movement of the ring against this frictional resistance increases the frictional contact with the rings 24 and 28 and, as a result, the tendency toward synchronized rotation of the gears 14 and 18 is increased. As the friction ring 24 is moved against the frictional resistance described it assumes a position eccentric to the shaft 10 and gear 14. It is caused to rotate in these changing eccentric positions against the frictional resistance aforesaid. At a position of maximum eccentricity it may pass over the ring 28 to the position shown in Figure 2. Through this frictional driving contact of the rings 24 and 28 the gears 14 and 18 are brought up toward synchronization before direct driving engagement is accomplished.

When the friction rings are in the position shown in Figure 1 they normally overlap throughout a complete revolution. When the ring 24 is at its position of maximum eccentricity it may at the point of its least projection from the axis of shaft 10 be moved axially over the ring 28. At certain other points it projects such a distance from the axis of shaft 10 that when such points are opposed to ring 28 the two rings overlap. During a complete revolution the rings therefore overlap at some points of their peripheries.

Therefore, when ring 24 is moved normally toward ring 28, it will, while revolving through any appreciable arc of its rotation, oppose a portion of its periphery to frictional contact with the periphery of ring 28. It is therefore apparent that regardless of the position of eccentricity at which ring 24 may be disposed at any particular time, it will, when brought during its rotation toward ring 28, so overlap the same that the two rings will be brought into frictional driving contact before the one ring passes axially over the other. This will be true even though ring 24 were at its position of maximum eccentricity with respect to shaft 10. While if it were not rotating it could, at its point of least projection from the axis of shaft 10, be moved to pass over ring 28. During rotation it will function under normal axial shifting function as above described.

This contacting driving engagement of the two rings which causes ring 24 to shift its position eccentrically with respect to shaft 10 against the frictional resistance imposed against such shifting by spring 26 tends to bring the two rings and their respective gears into the desired synchronous rotation. As the gears are brought into their direct driving engagement the rings pass over each other to the position shown in Figure 2.

In Figure 3 I have shown the synchronizing friction elements in frictional driving contact. The ring 24 is being shifted toward its maximum position of eccentricity. The gears 14 and 18 are being moved toward their position of direct driving engagement. Continuation of the movement axially of gear 14 will effect such direct driving engagement and cause the ring 24 to pass completely over the ring 28. In the construction of Figure 4 I show a modified form of my improvement wherein a coil spring is fitted within a recess 32 within the hub. The ring 24 is held by the spring 30 against the side of retaining ring 27 as shown. The spring 30 acts upon the ring 24 through a thrust ring 34. A plurality of these coil springs are arranged circumferentially about the hub 20 to exert a substantially uniform pressure upon the ring 24.

In Figure 5 I have illustrated my invention as adapted to an embodiment wherein co-axial members are brought into synchronized rotation prior to direct driving engagement. In this embodiment let 36 indicate a countershaft upon which are mounted gears 38 and 40, which gears are in mesh with gears 42 and 44 respectively.

Mounted upon a splined shaft 46 is a slidable clutch assembly indicated as 48. The hub of this clutch assembly, which is splined to shaft 46 to rotate therewith while having permitted axial movement thereover is formed, for assembly purposes, in two sections threaded together as illustrated. At one end this clutch assembly is provided with a toothed clutch member 50 adapted to engage a cooperating toothed clutch member 52 formed within the gear 42. At the opposite end this clutch assembly is provided with a toothed clutch member 54 adapted to engage a cooperating toothed clutch member 56 formed within gear 44.

Clutch assembly 48 includes two synchronizing friction elements in the form of annular discs or rings 58 and 60. Friction ring 58 is arranged adjacent to toothed clutch member 50 and a ribbon spring 62 holds the ring 58 against a thrust member 64 which is in turn held against a shoulder of the clutch assembly member as shown. Friction ring 60 is arranged adjacent to toothed clutch member 54 and a ribbon spring 66 holds the ring 60 against the thrust member 68 which is in turn held against a shoulder on the clutch assembly member as shown. A shifter ring 70 receives a shifter fork 72 in the usual manner. This shifter ring is centered by the ribbon springs 62 and 66 as illustrated.

Gear 42 is provided with a conical recess 74 adjacent to friction ring 58 which recess is adapted to receive such ring. The recess 74 is formed eccentric with respect to the gear 42. Gear 44 is provided with a conical recess 76 adjacent to friction ring 60 which recess is adapted to receive such ring. Recess 76 is formed eccentric with respect to gear 44.

Actuation of the shifter fork 72 in one direction urges friction ring 58 into frictional driving contact with the conical surface 74 of gear 42 and tends to equalize the rotation of clutch member 48 and gear 42 prior to toothed clutch member 50 engaging the cooperating toothed clutch member 52 of gear 42. Movement of the shifter fork in the other direction urges friction ring 60 into frictional driving contact with the conical surface 76 of gear 44 and tends to equalize the rotation of the clutch member 48 and gear member 44 prior to the toothed clutch member 54 engaging the cooperating toothed clutch member 56 of gear 44.

The friction rings 58 and 60, whichever one is moved into engagement with its cooperating conical surface, are urged radially against the frictional resistance to such movement produced by the pressure of ribbon springs 62 and 66 respectively. It is apparent that these rings will engage the conical recesses adapted to receive them regardless of the position within which the ring is located. If the ring is concentric to the axis of the clutch assembly it will, when shifted, engage its cooperating eccentrically positioned conical recess before the toothed clutch members are brought into engagement. If the ring is located at any eccentric position with respect to the axis of the clutch assembly it will, when shifted, engage at some point its cooperating conical recess.

Upon frictional engagement between either ring and its cooperating conical recess continued axial movement of the ring causes it to shift radially with respect to the clutch assembly against the resistance of the spring which holds it frictionally at whatever position it is placed. During this changing eccentric shifting of the friction ring the clutch assembly, and through it the shaft upon which it is splined, causes the gear to pick up its rotation to the desired synchronism before the toothed clutch members come into direct driving engagement.

Throughout those claims wherein the term "ring" is employed to designate any one of the synchronizing friction members such as 24 and 28 in Figs. 1 and 2, it is intended also to apply to those annular parts provided with conical faces 74 and 76 as well as the rings 58 and 60.

What I claim:

1. Power transmitting mechanism comprising, in combination, a pair of rotatable cooperative power transmitting members relatively axially movable into and out of driving engagement, a friction element associated with each member and normally rotatable therewith, said friction elements positioned and dimensioned to be brought into frictional contact during relative movement of said members toward driving engagement and prior to such engagement, one of said elements being resistingly shiftable under pressure against the other element to rotate to an unlimited extent eccentrically and relatively with respect to its power transmitting member to permit driving engagement of said power transmitting members.

2. Synchronized driving mechanism comprising, in combination, a driving gear, a driven gear, one of said gears being shiftable into and out of driving engagement with the other gear, a friction ring rotatable with each gear, means rotatable with one of the gears having a groove wherein the ring of said gear is mounted, a spring holding said ring frictionally against one side wall of the groove to rotate normally with its gear, said ring being relatively shiftable rotatably and radially within its groove, said rings being dimensioned to normally overlap when in relative rotation to frictionally contact upon shifting of one gear toward its position of driving engagement with the other gear and prior to such engagement, said ring disposed within the groove being radially shiftable therein against frictional resistance to permit driving engagement of the gears.

3. Synchronized driving mechanism comprising a drive shaft provided with a gear, a driven shaft provided with a gear, one of said gears being shiftable axially along its shaft into and out of driving engagement with the other gear, a friction ring associated with each of said gears, means carried by one shaft including a part provided with an annular channel, the friction ring on said shaft being mounted in said channel to rotate normally with the gear on the shaft, said ring being shiftable therein from a position concentric to the shaft to a position of maximum eccentricity with respect to the shaft, spring means holding said ring frictionally against one side wall of said channel, said ring overlapping the other ring when concentric to the shaft but having a non-overlapping position at its point of maximum eccentricity.

4. Power transmitting mechanism comprising a pair of spaced apart substantially parallel shafts, a gear on each shaft, one of said gears being shiftable axially into driving engagement with the other gear, a friction element normally rotatable with each gear, said elements being so dimensioned and positioned as to be brought during relative rotation into frictional driving contact prior to the driving engagement of said gears and upon axial movement of the one gear toward driving engagement with the other gear, means holding one of said elements yieldingly frictionally to rotate with its gear, said element being resistingly movable upon pressure against the other element to another position to pass axially rotatably thereover to permit movement of the gears into driving engagement.

5. Power transmitting mechanism comprising a driving member, a driven member, one of said members being shiftable into driving engagement with the other member, a friction element associated with each member and normally rotatable therewith, one of said elements having a fixed eccentric position with respect to its member, said other element being so positioned and dimensioned as to frictionally contact the first element prior to the effecting of driving engagement of said members and during movement of said members toward said driving engagement, one of said elements having an inner conical friction face, said other element being receivable into frictional engagement against said face, one of said elements being held normally frictionally to rotate with its member but being resistingly yieldable under pressure against the other element to shift its position with respect to its member to permit driving engagement of said members.

6. Power transmitting mechanism comprising a driving member, a driven member, one of said members being shiftable into driving engagement with the other member, a friction element associated with each member and normally rotatable therewith, one of said elements having a fixed eccentric position with respect to its member, said other element being so positioned and dimensioned as to frictionally contact the first element prior to the effecting of driving engagement of said members and during movement of said members toward said driving engagement, one of said elements having an inner conical friction face, said other element being receivable into frictional contact against said face, spring means holding one of said elements normally to rotate with its member at its held position but yieldable upon pressure of frictional contact between the elements to permit said element to shift eccentrically with respect to its member to permit engagement of said members.

7. Synchronizing mechanism comprising, in combination with a driving member and a driven member relatively movable into and out of driving engagement, friction elements associated with said members adapted during relative rotation to establish frictional driving contact during movement of said members into driving engagement and prior thereto, one of said elements being resistingly radially shiftable under said frictional driving contact to permit engagement of said members, said element being so supported that at any position to which it has been shifted radially it will, during rotation, frictionally contact its cooperating element before said members are brought into driving engagement and means normally holding said shiftable element at any position to which it is shifted, said means being yieldable to permit shiftable movement of the element.

8. Power transmitting mechanism comprising a rotatable driving member, a rotatable driven member, one member being shiftable into driving engagement with the other member, a friction element associated with each member to rotate therewith, means holding one element to rotate with its member while permitting limited resisted radial and rotatable shifting thereof with respect to the member and holding it at any position to which shifted, said elements being so relatively positioned and arranged as to frictionally contact during rotation and at any position to which the one element has been shifted upon relative movement of said members toward their driving engagement.

JOSEPH ZUBATY.